United States Patent
Li (10) Patent No.: US 9,597,762 B2
(45) Date of Patent: Mar. 21, 2017

(54) TOOL CHANGER PROVIDED WITH COVERS

(71) Applicant: FANUC Corporation, Yamanashi (JP)

(72) Inventor: Guanghui Li, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 58 days.

(21) Appl. No.: 14/511,428

(22) Filed: Oct. 10, 2014

(65) Prior Publication Data

US 2015/0105229 A1  Apr. 16, 2015

(30) Foreign Application Priority Data

Oct. 16, 2013  (JP) .................................. 2013-215607

(51) Int. Cl.
B23Q 3/157 (2006.01)
B23Q 11/08 (2006.01)
B23Q 16/02 (2006.01)

(52) U.S. Cl.
CPC ............. *B23Q 11/08* (2013.01); *B23Q 3/157* (2013.01); *B23Q 3/15706* (2013.01); *B23Q 16/02* (2013.01); *Y10T 483/115* (2015.01); *Y10T 483/15* (2015.01); *Y10T 483/1795* (2015.01)

(58) Field of Classification Search
CPC ........... Y10T 483/115; Y10T 483/1752; Y10T 483/1755; Y10T 483/1757; Y10T 483/176; Y10T 483/179; Y10T 483/1793; Y10T 483/1795; Y10T 483/1798; Y10T 483/1882; Y10S 483/90; B23Q 3/155–3/15793; B23Q 11/08–11/0891

USPC ....................... 483/3, 54–57, 38–41, 67, 900
See application file for complete search history.

(56) References Cited

U.S. PATENT DOCUMENTS

| 4,499,650 A * | 2/1985 | Cannon | B23Q 3/15526 211/1.53 |
| 5,499,963 A * | 3/1996 | Fujimoto | B23Q 3/15706 483/54 |
| 2011/0083307 A1 * | 4/2011 | Shih | B23Q 3/15706 483/56 |

(Continued)

FOREIGN PATENT DOCUMENTS

| JP | 4-86137 U | 7/1992 |
| JP | 2006-305663 A | 11/2006 |

(Continued)

OTHER PUBLICATIONS

Machine Translation JP 2006-305663 A, which JP '663 was published Nov. 9, 2006.*

(Continued)

*Primary Examiner* — Erica E Cadugan
(74) *Attorney, Agent, or Firm* — Hauptman Ham, LLP (57) ABSTRACT

A tool changer configured so that a turret is turned to index a desired tool to change the tool is provided with front and rear covers that cover front and rear surfaces, respectively, of the turret. A projection or a recess, which defines a passage for chips or a cutting fluid, is formed on or in an outer peripheral portion of the rear cover. Thus, the chips produced during machining and the cutting fluid used in the machining can be prevented from getting into the turret through a gap between the front and rear covers.

2 Claims, 11 Drawing Sheets

(56) References Cited

U.S. PATENT DOCUMENTS

| | | | |
|---|---|---|---|
| 2014/0256527 A1* | 9/2014 | Liu | B23Q 3/15706 483/54 |
| 2015/0087487 A1* | 3/2015 | Murota | B23Q 3/15773 483/3 |
| 2015/0111710 A1* | 4/2015 | Murota | B23Q 3/157 483/13 |
| 2015/0190897 A1* | 7/2015 | Murota | B23Q 11/08 483/69 |

FOREIGN PATENT DOCUMENTS

| | | |
|---|---|---|
| JP | 2008-229770 A | 10/2008 |
| JP | 2010-99766 A | 5/2010 |
| JP | 2011-173197 A | 9/2011 |

OTHER PUBLICATIONS

Machine Translation of Japanese Patent Application No. 2013-217756, filed Oct. 18, 2013.*
Machine Translation of Japanese Patent Application No. 2014-002014, filed Jan. 8, 2014.*
Machine Translation of Japanese Patent Application No. 2013-199913, filed Sep. 26, 2013.*
Merriam-Webster's Collegiate Dictionary, $10^{th}$ ed., p. 849, definition of "passage", copyright 1998.*
Office Action mailed Mar. 24, 2015, corresponding to Japanese patent application No. 2013-215607.
Office Action mailed Dec. 16, 2014, corresponding to Japanese patent application No. 2013-217756.

* cited by examiner

TOOL CHANGER PROVIDED WITH COVERS

RELATED APPLICATIONS

The present application claims priority to Japanese Application Number 2013-215607, filed Oct. 16, 2013, the disclosure of which is hereby incorporated by reference herein in its entirety.

BACKGROUND OF THE INVENTION

Field of the Invention

The present invention relates to a tool changer provided with covers configured to prevent extraneous matter from getting into a turret.

Description of the Related Art

A tool changer is conventionally used to automatically change a tool to be mounted on the spindle of a machine tool. This tool changer is previously fitted with a plurality of necessary work tools such that the tool to be mounted on the machine tool spindle can be automatically replaced with a specified one, depending on the machining state.

Japanese Patent Application Laid-Open No. 2010-99766 discloses a machine tool provided with such an automatic tool changer for automatically changing a tool. This tool changer comprises a turret provided with a plurality of grips for gripping the tool.

The automatic tool changer comprises the turret fitted with a plurality of tools such that the turret can be indexed to change the tool mounted on the spindle, whereby the tool can be changed rapidly and accurately. Since the front side of the turret and a turret base are only connected at a distance from each other, however, chips produced during machining and a cutting fluid may possibly get into the turret.

Figure 11:
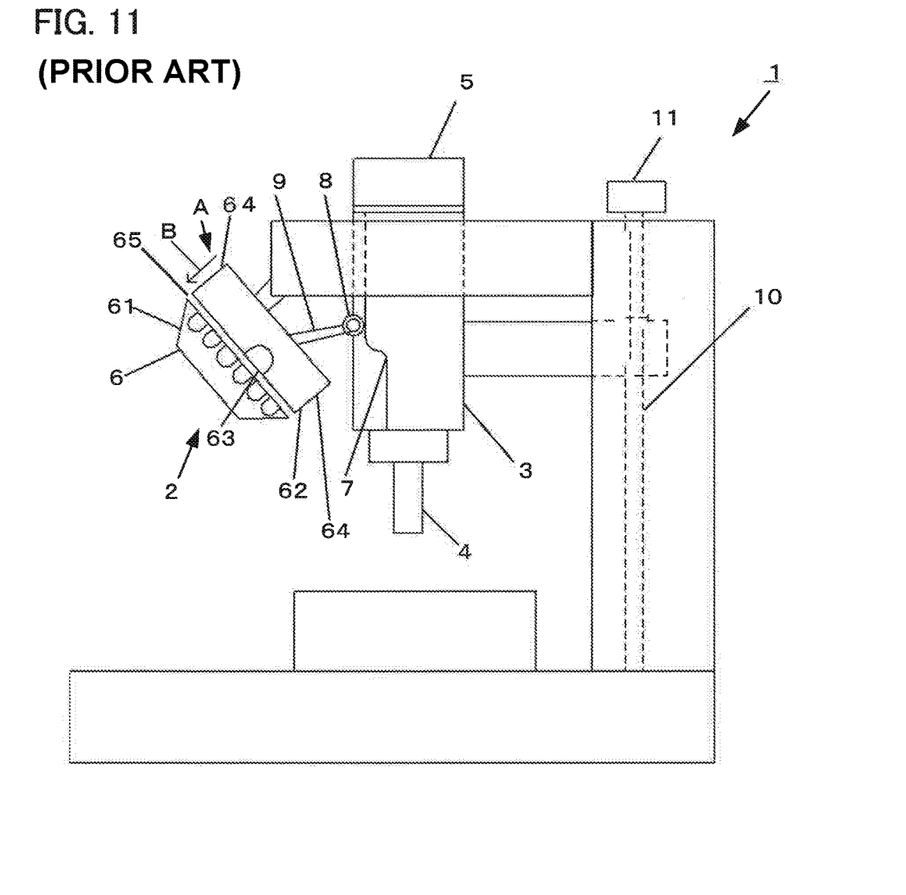
FIG. 11 is a schematic side view of a machine tool provided with a prior art tool changer.

In some cases, therefore, the turret may be provided with cover means that prevents the chips and cutting fluid from getting into the turret during workpiece machining. FIG. 11 shows a prior art example of a machine tool furnished with a tool changer comprising such cover means.

In FIG. 11, an automatic tool changer 2 attached to a machine tool 1 comprises a spindle 3 and a spindle motor 5 for driving the spindle 3. A tool 4 is mounted on the distal end portion of the spindle 3. Further, a Z-axis motor 11 is connected to the spindle 3 by a Z-axis ball screw 10, and the spindle 3 can be driven vertically by the Z-axis motor 11. Furthermore, a turret 6 is provided as a member for changing the tool 4.

The turret 6 is provided with a front cover 61 and a rear cover 62 that eliminate adverse affects on structural parts (not shown) in the turret 6. The front and rear covers 61 and 62 serve to prevent penetration of the chips and cutting fluid from the front and rear sides, respectively, of the turret 6.

Depending on the shape of the rear cover 62, chips and the cutting fluid may easily accumulate on an upper part (corresponding to region A of FIG. 11) of a cylindrical portion 64 of the rear cover 62. In changing the tool 4, the spindle 3 is driven vertically by the Z-axis motor 11. Since the spindle 3 is provided with a cam 7, the turret 6 is swung by a cam follower 8 that follows the cam 7 as the spindle 3 is moved vertically. As the turret 6 is swung in this manner, chips and the cutting fluid deposited on the upper part (regions A) of the cylindrical portion 64 of the rear cover 62 move along path B shown in FIG. 11, and inevitably get into the turret 6 through a gap 65 between the front and rear covers 61 and 62. Consequently, the structural parts in the turret 6 may be adversely affected.

SUMMARY OF THE INVENTION

Accordingly, the object of the present invention is to provide a tool changer of a machine tool, comprising covers configured to prevent chips and a cutting fluid from getting into a turret.

A tool changer according to the present invention comprises a turret with a plurality of grips for holding a tool such that the turret is turned to index a desired tool to change the tool. The tool changer comprises a front cover which covers a front surface of the turret and a rear cover which covers a rear surface of the turret. A projection or a recess, which defines a passage for chips or a cutting fluid, is formed on or in at least a part of an outer peripheral portion of the front cover and/or the rear cover.

According to the present invention, chips produced during workpiece machining and the cutting fluid used in the machining are dropped along the projection or recess on or in the outer peripheral portion of the rear cover (or front cover), so that they can be prevented from getting into the turret through a gap between the front and rear covers.

According to the present invention, there can be provided a tool changer of a machine tool, comprising cover means configured to prevent chips and a cutting fluid from getting into a turret.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

First, a first embodiment of a tool changer according to the present invention will be described with reference to FIG. 1.

Figure 1:
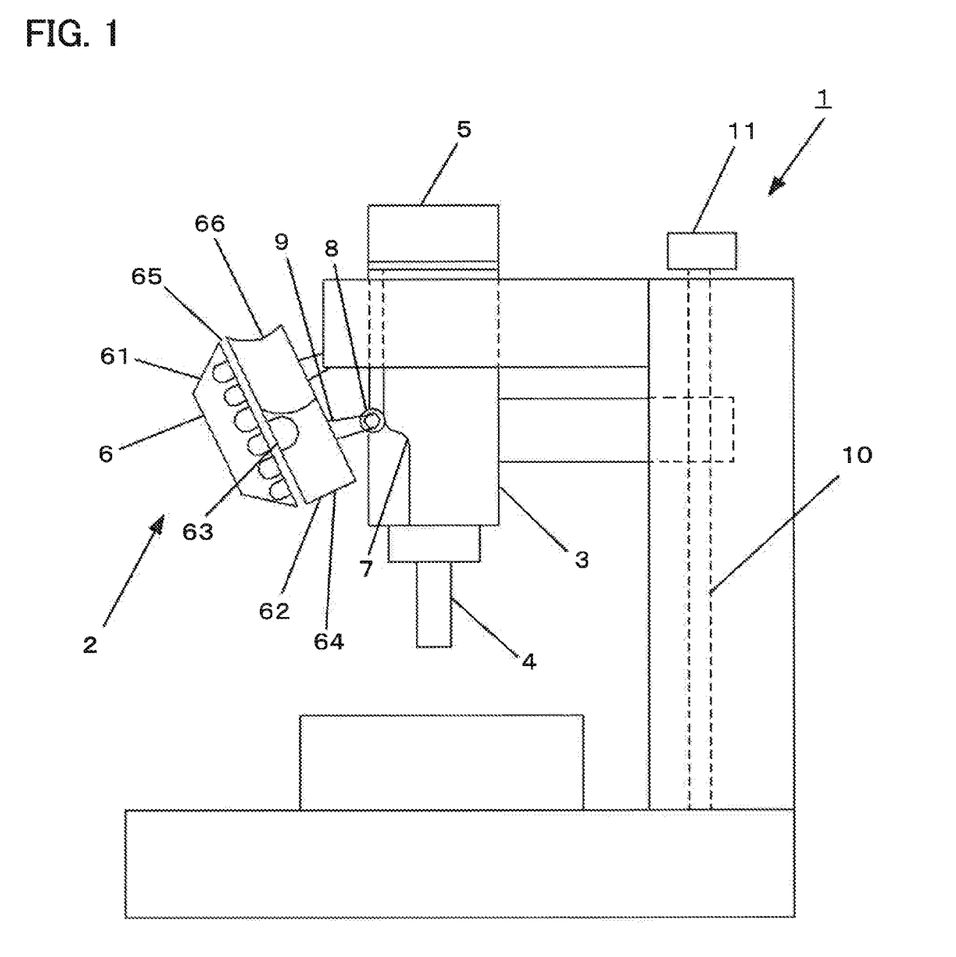
FIG. 1 is a schematic side view of a machine tool provided with a first embodiment of a tool changer according to the present invention.
Figure 2:
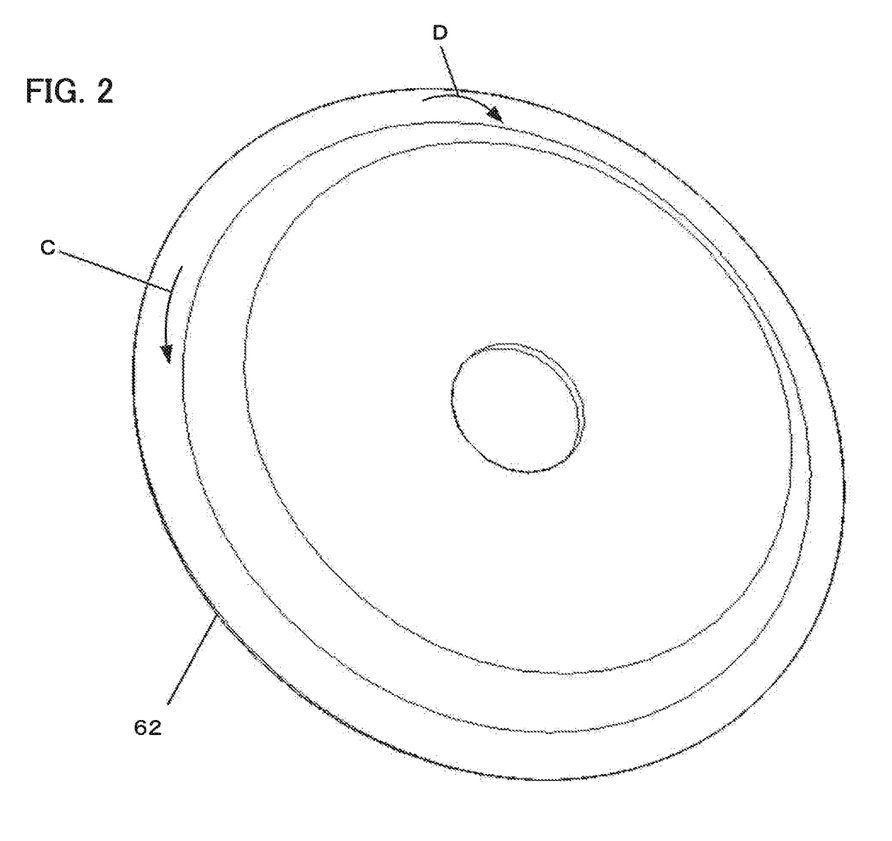
FIG. 2 is a diagram illustrating how a cutting fluid deposited on an upper part of a cylindrical portion of a rear cover of the tool changer flows in the directions of arrows C and D.

The tool changer of this embodiment differs from the prior art tool changer shown in FIG. 11 in that a recess 66 with a semicircular cross-section is provided in an upper part (corresponding to region A of FIG. 11) of an outer peripheral portion of a rear cover 62, as shown in FIG. 1. Thus, chips produced as a workpiece is machined and a cutting fluid used in machining the workpiece are guided left and right relative to a front cover 61, as indicated by arrows C and D in FIG. 2, so that they can be prevented from getting into a turret 6 through a gap 65 defined between the front and rear covers 61 and 62.

The turret 6 is provided with a plurality of grips for holding a tool 4.

In changing the tool 4, a spindle 3 is driven to move vertically by a Z-axis motor 11. Since the spindle 3 is provided with a cam 7, the turret 6 is swung by a cam follower 8 that follows the cam 7 as the spindle 3 is moved vertically. As the turret 6 is swung in this manner, chips deposited on the upper part of the outer peripheral portion of the rear cover 62 and the collected cutting fluid flow along the semicircular-profiled recess 66 and are dropped outside the turret 6.

Thus, the chips and the cutting fluid can be prevented from getting into the turret 6 and affecting structural parts (not shown) in the turret 6.

Some modifications of the first embodiment (FIG. 1) of the tool changer will be described with reference to FIGS. 3 to 5.

Figure 3:
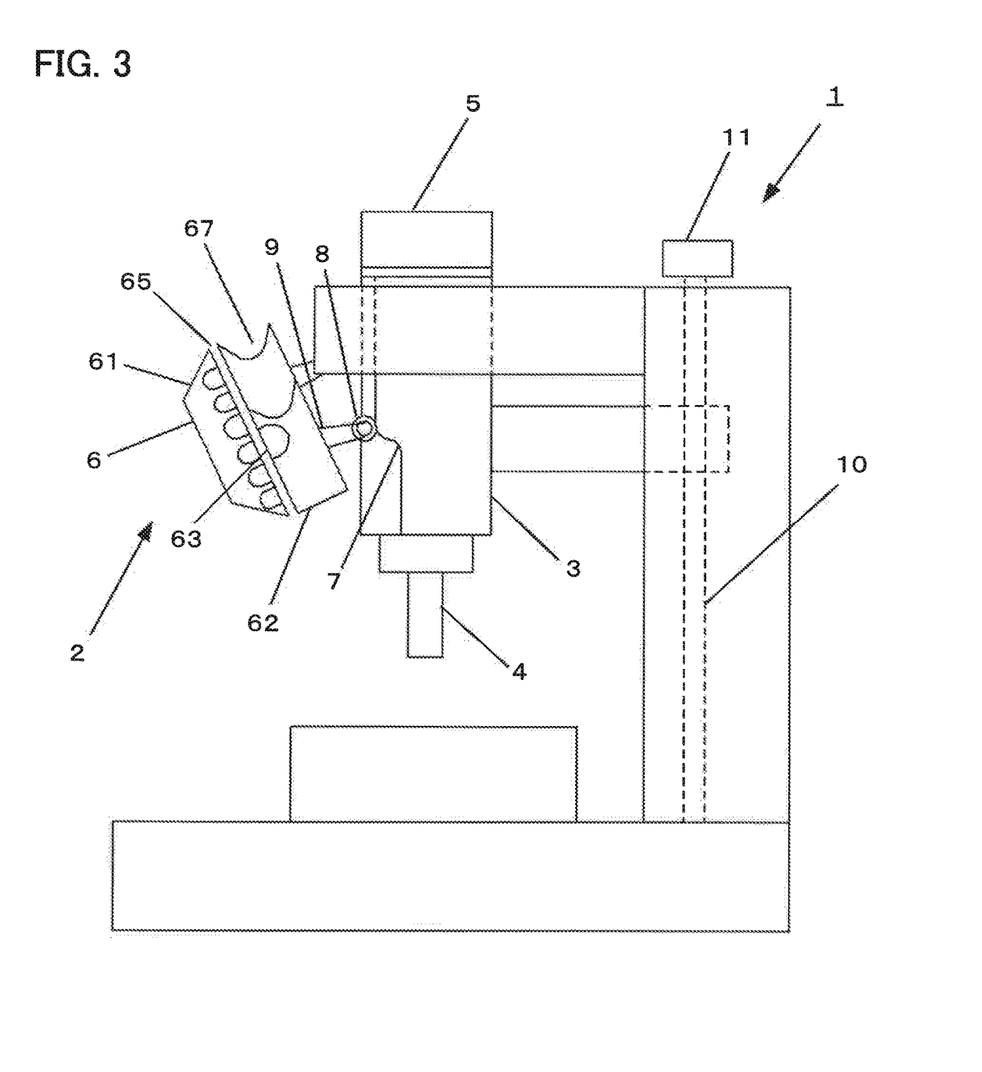
FIG. 3 is a diagram illustrating a first modification of the first embodiment (FIG. 1) of the tool changer.
Figure 4:
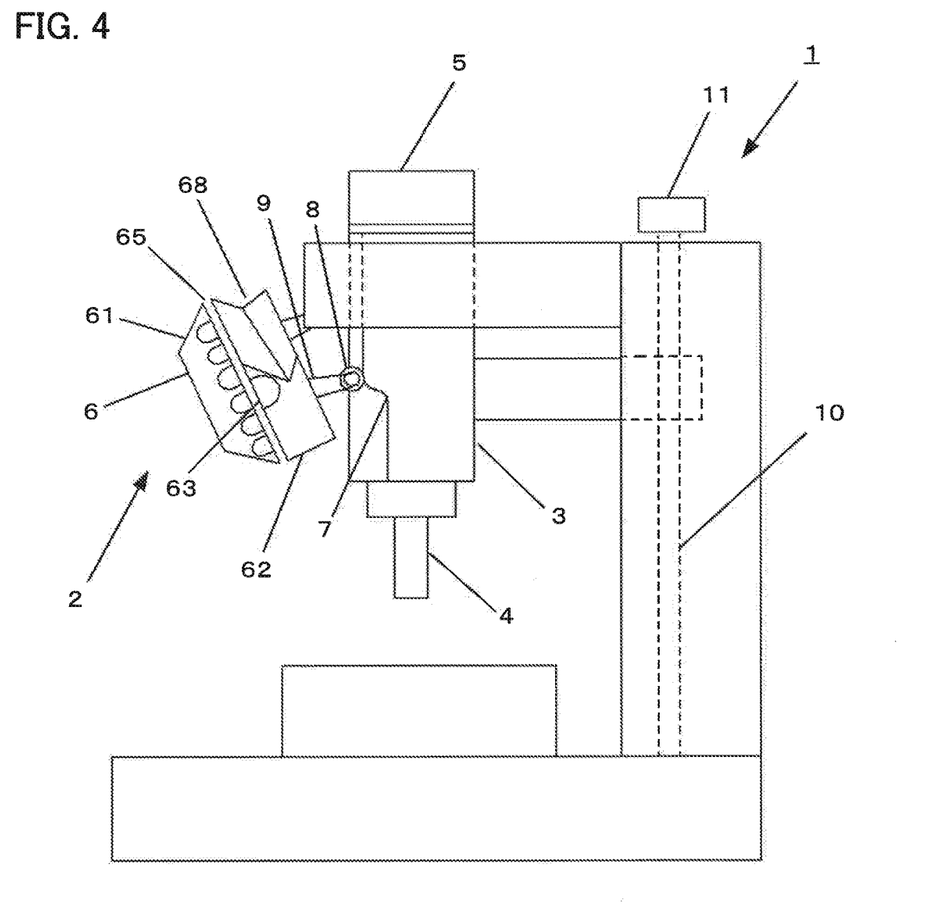
FIG. 4 is a diagram illustrating a second modification of the first embodiment (FIG. 1) of the tool changer.

A first modification differs from the first embodiment (FIG. 1) in that the cross-section of a recess 67 provided in the upper part of the outer peripheral portion of the rear cover 62 is U-shaped, as shown in FIG. 3. A second modification differs from the first embodiment in that the cross-section of a recess 68 provided in the upper part of the outer peripheral portion of the rear cover 62 is V-shaped, as shown in FIG. 4. Further, a third modification differs from the first embodiment in that the cross-section of a recess 69 provided in the upper part of the outer peripheral portion of the rear cover 62 is trapezoidal, as shown in FIG. 5.

In the first to third modifications described above, the recesses 67 to 69 have the same functions as the recess 66 of the first embodiment. Specifically, chips produced as a workpiece is machined and a cutting fluid used in machining the workpiece are guided left and right relative to the front cover 61, as indicated by arrows C and D in FIG. 2, so that they can be prevented from getting into the turret 6 through the gap 65 defined between the front and rear covers 61 and 62.

Figure 5:
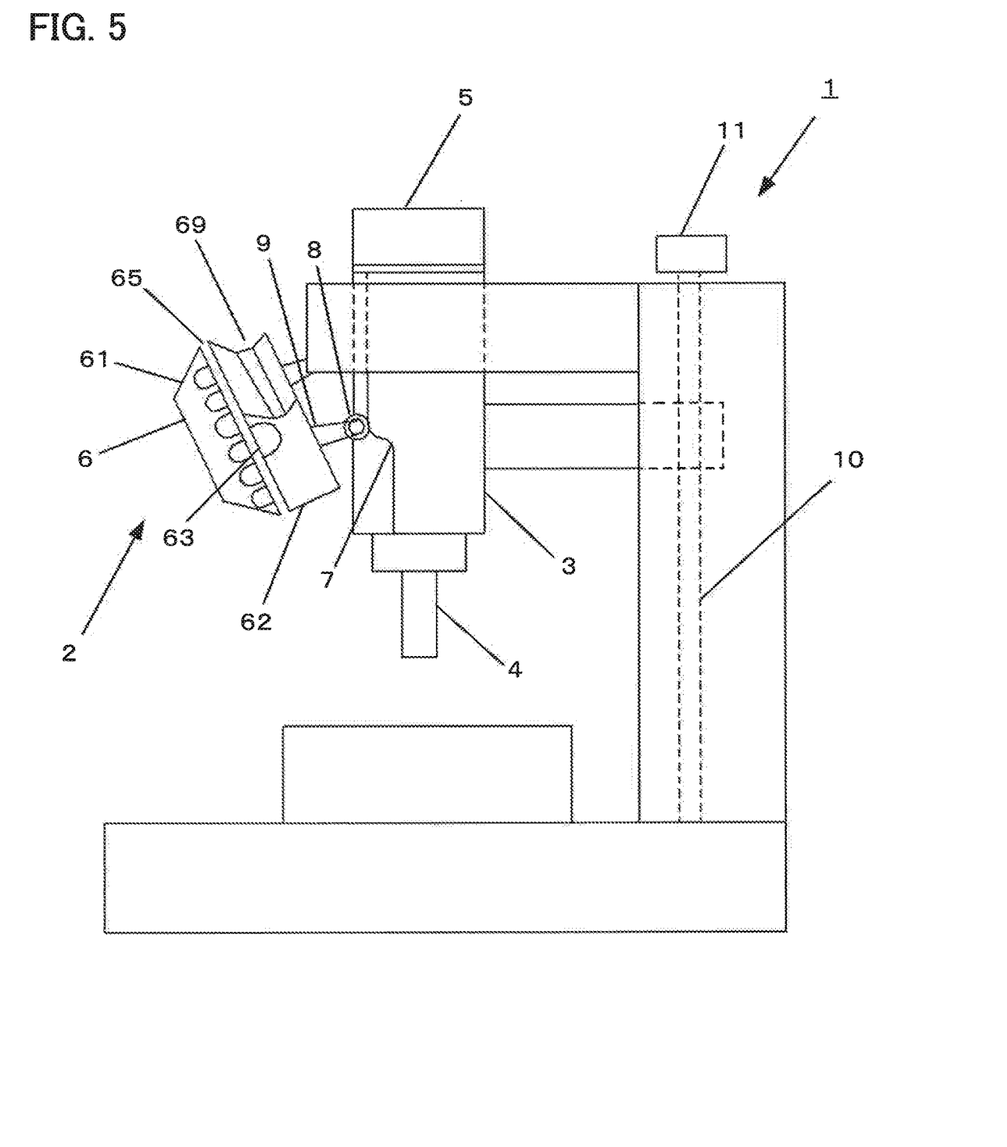
FIG. 5 is a diagram illustrating a third modification of the first embodiment (FIG. 1) of the tool changer.

In the first embodiment and its modifications, as described above, the cross-section of the recess provided in (at least the upper part of) the outer peripheral portion of the rear cover 62 is assumed to be semicircular (FIG. 1), U-shaped (FIG. 3), V-shaped (FIG. 4), or trapezoidal (FIG. 5). However, the cross-section of the recess may be of any other shape that enables the chips produced as the workpiece is machined and the cutting fluid used in machining the workpiece to be guided left and right (in the directions indicated by arrows C and D in FIG. 2).

Figure 6:
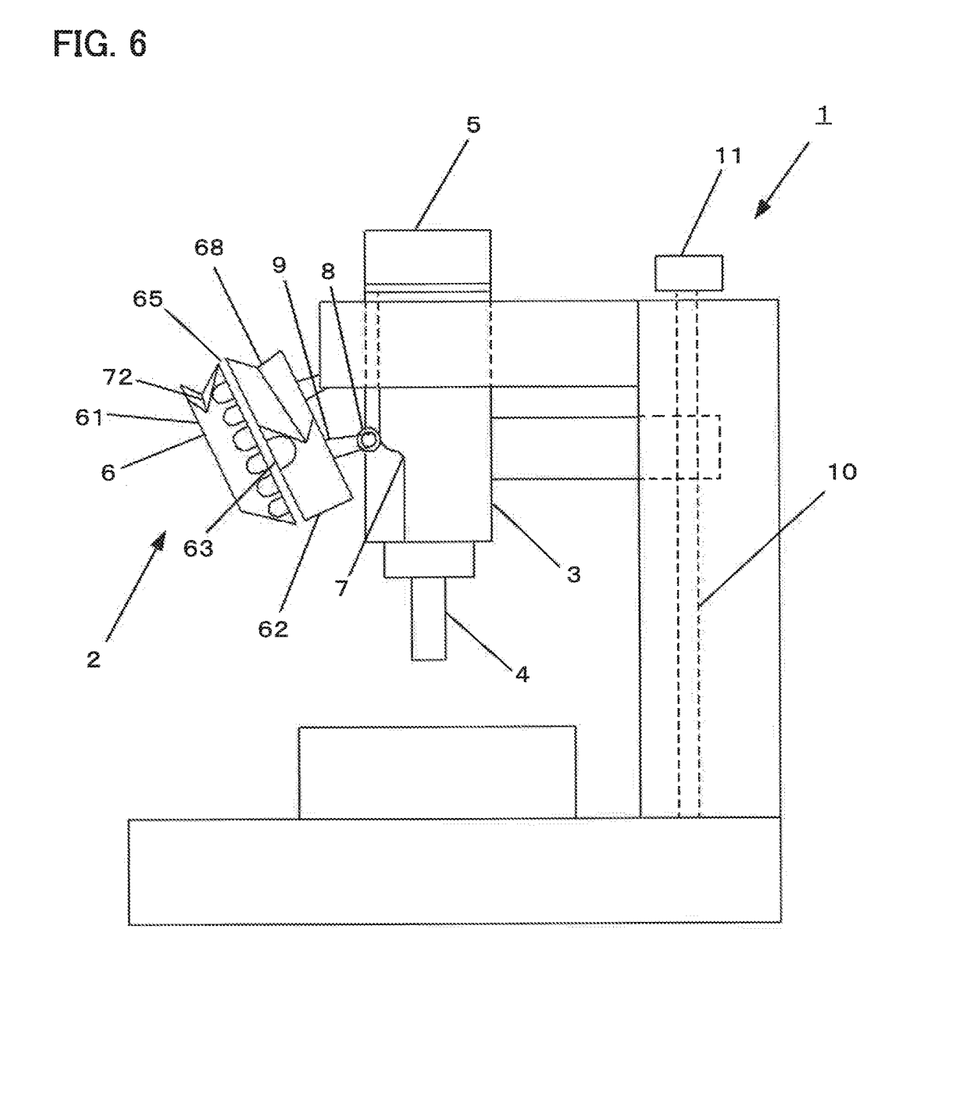
FIG. 6 is a diagram illustrating an example in which a recess is also provided in an upper part of an outer peripheral portion of a front cover of the tool changer of FIG. 4 in which a recess is provided in an upper part of an outer peripheral portion of the rear cover.

In the first embodiment (FIG. 1) and its modifications (FIGS. 3 to 5), moreover, the recess is provided only in the upper part of the outer peripheral portion of the rear cover 62. Alternatively, however, the recess may be provided so that it covers the entire circumference of the outer peripheral portion of the rear cover 62. As shown in FIG. 6, moreover, recesses may be provided individually in the front cover 61 and the upper part of the outer peripheral portion of the rear cover 62. FIG. 6 shows an example in which the recess 68 is provided in the upper part of the outer peripheral portion of the rear cover 62, and a recess 72 is provided in the upper part of the outer peripheral portion of the front cover 61.

Figure 7:
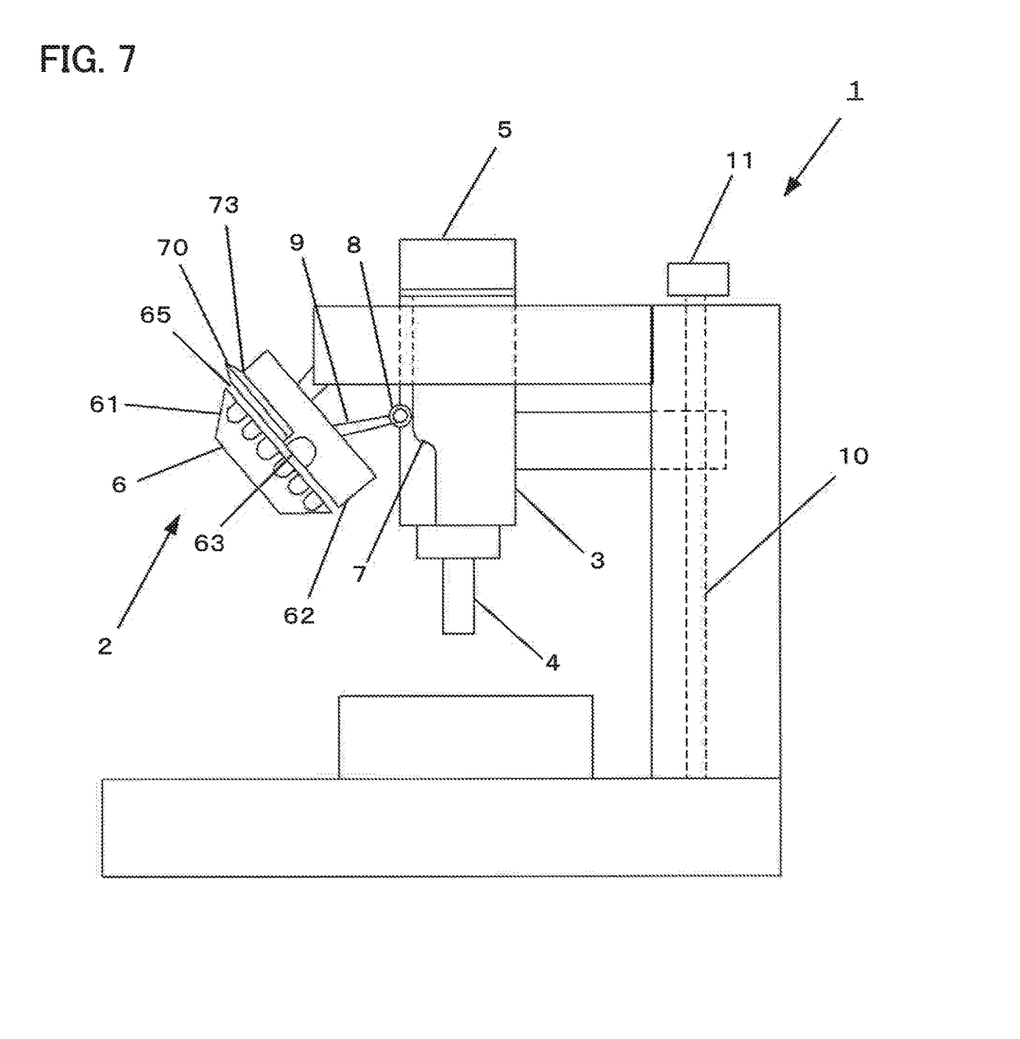
FIG. 7 is a schematic side view of a machine tool provided with a second embodiment of the tool changer according to the present invention.

A second embodiment of the tool changer according to the present invention will now be described with reference to FIG. 7.

The tool changer of this embodiment differs from the tool changer of the first embodiment in that a projection is provided in place of the recess on an upper part (corresponding to region A of FIG. 11) of an outer peripheral portion of a rear cover 62.

In this embodiment, a projection 70 with a triangular cross-section is provided on the upper part of the outer peripheral portion of the rear cover 62. Thus, chips produced as a workpiece is machined and a cutting fluid used in machining the workpiece are guided left and right relative to a front cover 61, as indicated by arrows C and D in FIG. 2, so that they can be prevented from getting into a turret 6 through a gap 65 defined between the front and rear covers 61 and 62.

In changing the tool 4, a spindle 3 is driven to move vertically by a Z-axis motor 11. Since the spindle 3 is provided with a cam 7, the turret 6 is swung by a cam follower 8 that follows the cam 7 as the spindle 3 is moved vertically. As the turret 6 is swung in this manner, chips deposited on the upper part of the outer peripheral portion of the rear cover 62 and the collected cutting fluid flow along the triangular-profiled projection 70 and are dropped outside the turret 6. Thus, the chips and the cutting fluid can be prevented from getting into the turret 6 and affecting structural parts in the turret 6.

One modification of the second embodiment (FIG. 7) of the tool changer will be described with reference to FIG. 8.

Figure 8:
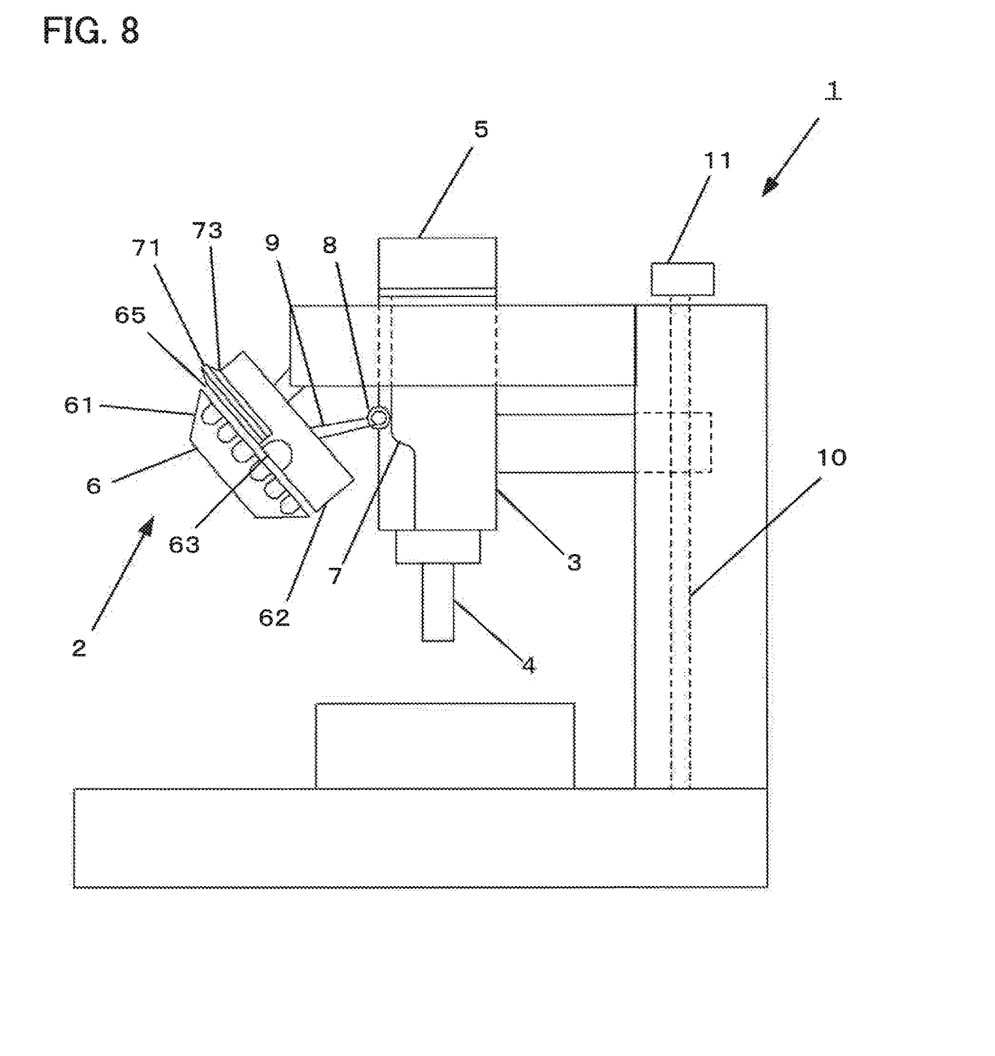
FIG. 8 is a diagram illustrating a first modification of the second embodiment (FIG. 7) of the tool changer.

This modification differs from the second embodiment (FIG. 7) in that the cross-section of a projection 71 provided on the upper part of the outer peripheral portion of the rear cover 62 is trapezoidal, instead of being triangular, as shown in FIG. 8.

In this modification, the projections have the same functions as that of the second embodiment. Specifically, chips produced as a workpiece is machined and a cutting fluid used in machining the workpiece are guided left and right relative to the front cover 61, as indicated by arrows C and D in FIG. 2, so that they can be prevented from getting into the turret 6 through the gap 65 defined between the front and rear covers 61 and 62.

In the second embodiment and its modifications, as described above, the cross-section of the projection provided on (at least the upper part of) the outer peripheral portion of the rear cover 62 is assumed to be triangular or trapezoidal. However, the cross-section of the projection may be of any other shape that enables the chips produced as the workpiece is machined and the cutting fluid used in machining the workpiece to be guided left and right (in the directions indicated by arrows C and D in FIG. 2).

Figure 9:
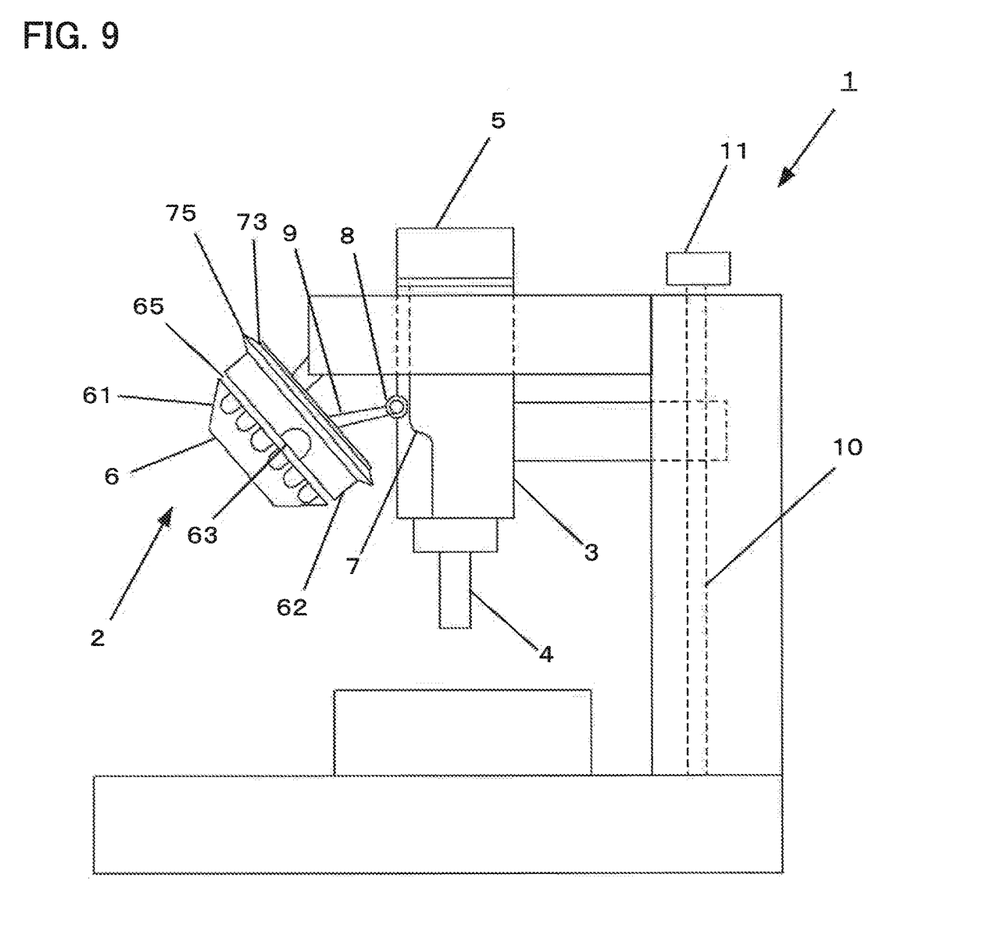
FIG. 9 is a diagram illustrating a second modification of the second embodiment (FIG. 7) of the tool changer.
Figure 10:
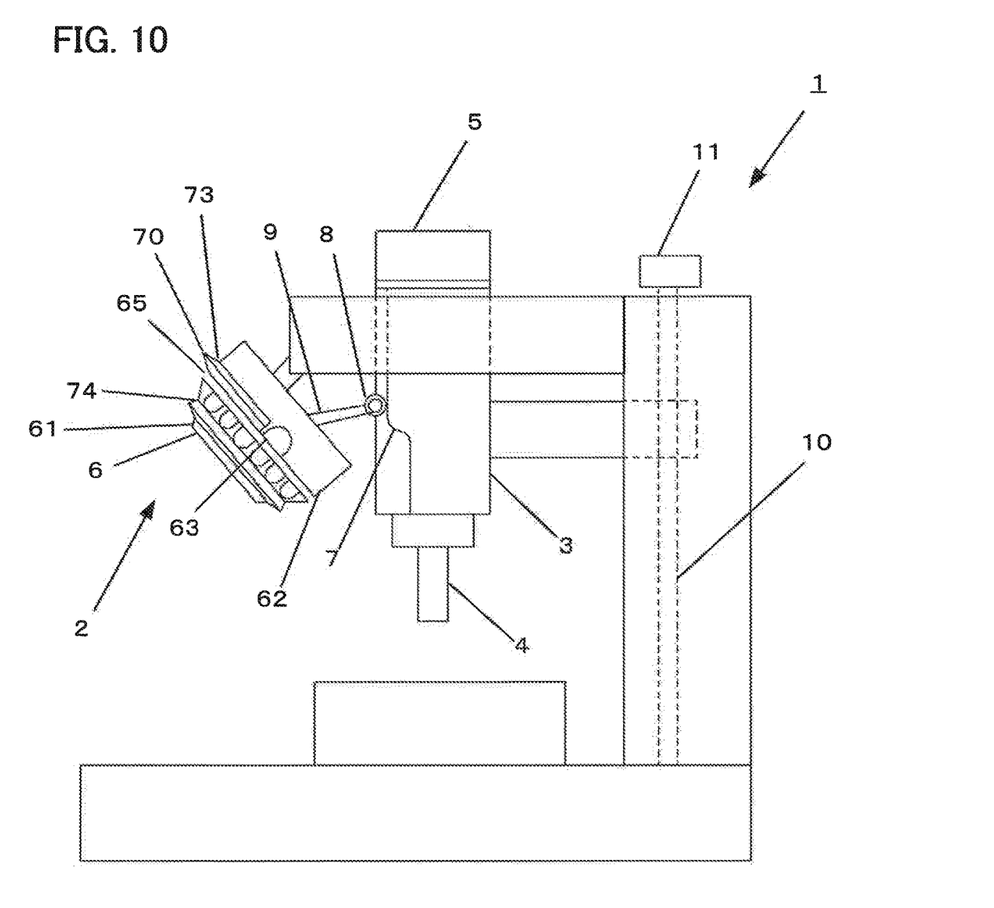
FIG. 10 is a diagram illustrating a third modification of the second embodiment (FIG. 7) of the tool changer.

In the second embodiment (FIG. 7) and its modification (FIG. 8), moreover, the projection is provided only on the upper part of the outer peripheral portion of the rear cover 62. Alternatively, however, the projection may be provided so that it covers the entire circumference of the outer peripheral portion of the rear cover 62, as shown in FIG. 9. Instead of providing the projection on the outer peripheral portion of the rear cover 62, moreover, a projection may be provided on the outer peripheral portion of the front cover 61 or projections may be provided individually on the respective outer peripheral portions of the front and rear covers 61 and 62, as shown in FIG. 10. Alternatively, furthermore, a recess may be provided in one of the outer peripheral portions of the front and rear covers 61 and 62, and a projection on the other.

The invention claimed is:

1. A tool changer, comprising:
   a turret having a plurality of grips each configured to grip a respective tool, the tool changer being adapted to change a tool mounted on a spindle of a machine tool by indexing a desired tool by rotating the turret in a rotational direction about a rotational axis of the turret;
   a front cover which covers a first surface of the turret;
   a rear cover which covers a second surface of the turret; and
   a gap defined between the front cover and the rear cover, wherein
   the turret is configured to move between a tool changing position and a tool non-changing position when the spindle of the machine tool moves along a Z-axis,
   when the turret is positioned at the tool non-changing position,
      the first surface of the turret is positioned farther from the spindle of the machine tool than from the gap,
      the second surface of the turret is positioned closer to the spindle of the machine tool than the gap is, and
      a position of an upper end portion of the rear cover is higher than a position of an upper end portion of the front cover,
   a projection or a recess is formed on the rear cover at an upper surface on a side of the upper end portion of the rear cover,
   a passage is defined by the projection or the recess, and
   the passage is configured to
      guide chips or a cutting fluid in the rotational direction of the turret, and
      prevent the guided chips or cutting fluid from coming into contact with a spindle motor, which is configured to rotate the spindle of the machine tool.

2. The tool changer according to claim 1, wherein the recess is formed on the rear cover and the recess has a semicircular, U-shaped, V-shaped, or trapezoidal cross-section.

* * * * *